July 13, 1943.　　　C. HELM　　　2,324,082
BATTERY TERMINAL PROTECTIVE DEVICE
Filed Nov. 3, 1942
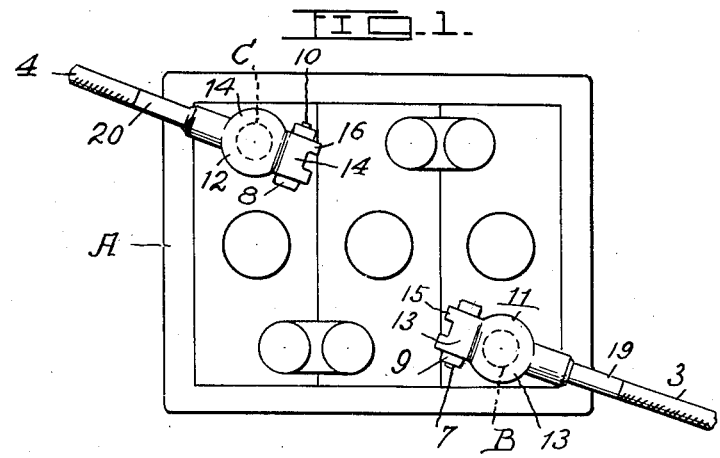
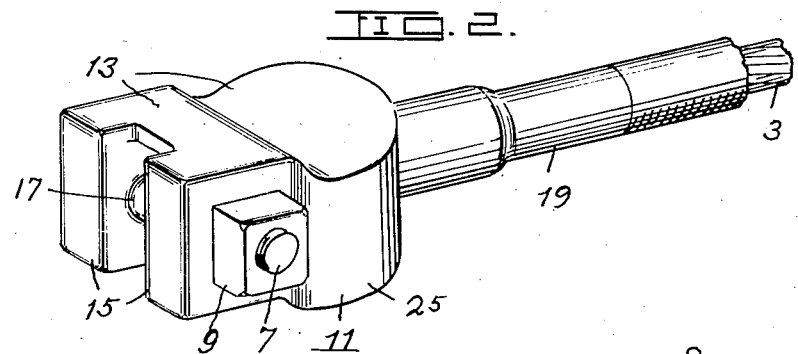
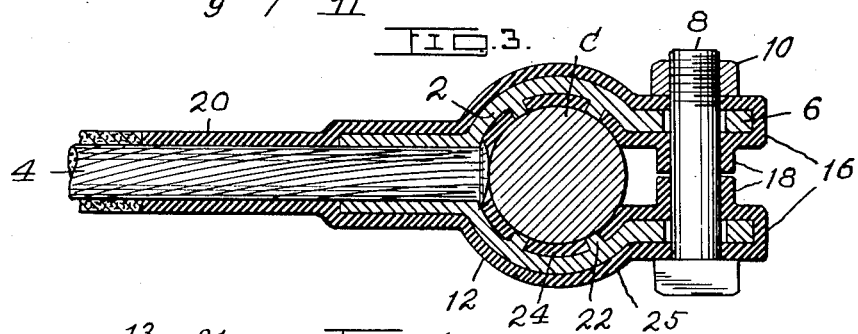
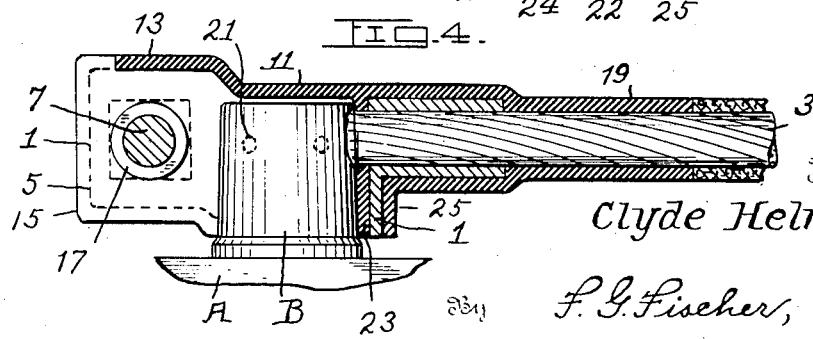
Inventor:
Clyde Helm,
F. G. Fischer,
Attorney.

Patented July 13, 1943

2,324,082

UNITED STATES PATENT OFFICE 2,324,082

BATTERY TERMINAL PROTECTIVE DEVICE

Clyde Heim, Kansas City, Mo.

Application November 3, 1942, Serial No. 464,327

4 Claims. (Cl. 173—259)

My invention relates to a new and useful battery connector or clamp for use more particularly on the terminals of automotive storage batteries, although I do not wish to be confined to the use of my invention on this particular type of battery but reserve the right to use it on the terminal posts of all other batteries to which it can be applied either in the form shown in the accompanying drawing, or in such other forms and modifications thereof as may fall within the scope of the invention as hereinafter claimed.

The chief object of my invention is to provide battery clamps with protective means of suitable insulating material that will prevent corrosion of the clamps and the battery posts to which they are applied by keeping them free from dust, water, electrolyte and other foreign substances having a detrimental effect upon the terminals and efficiency of the battery.

In order that the invention may be fully understood, reference will now be had to the accompanying drawing, in which:

Fig. 1 is a plan view of a storage battery, the terminals of which are equipped with the protective means.

Fig. 2 is a perspective view of a terminal clamp equipped with the protective means.

Fig. 3 is a horizontal sectional view of one of the clamps encased in the protective means and applied to a battery post.

Fig. 4 is a vertical longitudinal sectional view of parts similar to those shown by Fig. 3.

Referring in detail to the different parts, A designates a storage battery equipped with the customary positive and negative terminal posts B and C, respectively.

Terminal clamps 1 and 2, with split body portions adapted to embrace the posts B and C, are equipped with customary lead and return wire conductors 3 and 4, respectively, forming parts of the battery circuit. Jaws 5 and 6 of the clamps 1 and 2 are provided with alined openings for reception of the usual transverse bolts 7 and 8 having nuts 9 and 10 for securing the clamps in cooperative relation with the posts B and C.

In order to protect the terminal posts B and C, the clamps 1 and 2, and the adjacent ends of the wire conductors 3 and 4 from dust, water, electrolyte and other detrimental foreign substances likely to cause corrosion of the terminals, and especially to prevent such substances from getting in between the posts B and C and the clamps 1 and 2, I encase the clamps in protectors 11 and 12 which are provided with hoods 13 and 14, that extend over the upper ends of the posts B and C and the respective bolts 7 and 8. The protectors 11 and 12 have extensions 15 and 16 covering the jaws 5 and 6 of the clamps and provided with axially alined tubular projections 17 and 18 which encase and protect intermediate portions of the respective bolts 7 and 8, but are sufficiently flexible to permit the respective jaws 5 and 6 to be drawn toward each other by the associated bolts and nuts. The protectors 11 and 12 also have sleeves 19 and 20 which cover adjacent ends of the respective wire conductors 3 and 4.

The protectors 11 and 12 comprise any suitable insulating material such, for example, as a rubber composition, a plastic composition, or any other appropriate insulating material that will prevent corrosion of the terminal posts B and C, the clamps 1 and 2, the bolts 7 and 8, and adjacent ends of the respective wire conductors 3 and 4, by keeping them free of detrimental foreign substances. The material constituting the protectors 11 and 12 is sufficiently resilient to permit normal contraction or expansion of the clamps 1 and 2 while being applied to or removed from the respective terminal posts B and C.

In order that electric current from the battery A may flow freely through the wire conductors 3 and 4, one end of each conductor is left exposed to contact with the associated post, as shown by Figs. 3 and 4. The clamps 1 and 2 are also provided with spaced inwardly extending contacts 21 and 22, which project into spaced apertures in the inner walls 23 and 24 of the protectors to engage the respective posts B and C and thus afford additional paths for the flow of electric current to and from the battery.

While I prefer to substantially incase each clamp completely within the protective covering as shown by the drawing, most of the outer wall 25 of the protective means may be dispensed with as the inner wall 23 or 24 and hood 13 or 14 will afford efficient protection for the associated clamp and terminal post.

In order to apply the protected clamp 2 to a battery post, the nut 10 is loosened to permit the split body portion to expand so that it will readily pass down in position upon the post. The nut 10 is then tightened to draw the jaws 6 towards each other and compress the inner wall 24 of the insulating material into frictional engagement with the post and thus reliably hold the clamp in assembly therewith. Tightening of the nut 10 also draws the contacts 22 into engagement with the battery post so that electric current can flow freely to the clamp 2 and the remainder of the battery circuit (not shown). Current may also flow directly to the conductor 4 through the end thereof in direct contact with the battery post C. The same procedure is followed in applying one of the clamps to the positive post B of the battery.

From the foregoing description taken in connection with the accompanying drawing, it is apparent that I have provided simple and inexpensive protective means for the terminals of storage batteries which will prolong the life and efficiency of such batteries by keeping their terminals clean and free from detrimental effects of foreign substances which corrode the terminals and lower efficiency of the battery.

Having thus described my invention, what I claim and desire to secure by Letters Patent, is:

1. A battery clamp comprising a split body portion adapted to encompass a battery post, a conductor projecting through an opening in said body portion, insulating material covering the inner surface of said body portion and provided with a plurality of spaced apertures and an opening through which latter said conductor projects into engagement with the battery post, spaced contacts projecting into said apertures from the inner surface of the body portion, and means for contracting the body portion in order to compress the insulating material and force said contacts into electrical engagement with the battery post.

2. A battery clamp comprising a split body portion adapted to encompass a battery post and provided with a pair of spaced jaws, a bolt projecting through alined openings in said jaws, a nut threaded upon one end of said bolt and adapted to cooperate therewith in drawing the jaws towards each other to firmly hold the clamp in position upon the post, and insulating material covering the clamp and provided with alined tubular projections to encase the intermediate portion of the bolt.

3. A battery clamp comprising a split body portion adapted to encompass a battery post and provided with a pair of spaced jaws, insulating material covering said jaws and the inner and outer surfaces of the body portion, that portion of the insulating material covering the inner surface of the body portion having spaced apertures, spaced contacts projecting into the apertures from the inner surface of the body portion, a bolt projecting through alined openings in the jaws, a nut threaded upon one end of said bolt and adapted to cooperate therewith in drawing the jaws towards each other to compress the apertured portion of the insulating material and force said contacts into electrical engagement with the battery post, and alined tubular projections of insulating material covering the intermediate portion of the bolt.

4. A battery clamp comprising a split body portion adapted to encompass a battery post and provided with a pair of spaced jaws, a bolt projecting through alined openings in said jaws, a nut threaded upon one end of said bolt and adapted to cooperate therewith in drawing the jaws towards each other to firmly hold the clamp in position upon the post, and insulating material covering the clamp and provided with alined tubular projections to encase the intermediate portion of the bolt, said insulating material also having a hood to cover the upper end of the post and extend over the bolt.

CLYDE HELM.